United States Patent [19]

Negishi et al.

[11] Patent Number: 5,153,585
[45] Date of Patent: Oct. 6, 1992

[54] ELECTRONIC INPUT-DISPLAY APPARATUS

[75] Inventors: Fumio Negishi; Yasuo Komori, both of Shizuoka, Japan

[73] Assignee: Tokyo Electric Co., Ltd., Tokyo, Japan

[21] Appl. No.: 815,541

[22] Filed: Dec. 26, 1991

Related U.S. Application Data

[63] Continuation of Ser. No. 467,846, Jan. 22, 1990, abandoned.

[30] Foreign Application Priority Data

Feb. 7, 1989 [JP] Japan .................................. 1-26558

[51] Int. Cl.$^5$ .............................................. G08C 17/00
[52] U.S. Cl. ............................ 340/870.280; 364/405;
364/466; 340/825.69
[58] Field of Search ............... 340/870.11, 870.28,
340/825.69, 539; 455/271, 283, 129, 347;
343/702; 177/25.15, D10, 25.12; 364/404, 405,
406; 235/7 R, 10

[56] References Cited

U.S. PATENT DOCUMENTS

| 2,565,661 | 8/1951 | Lidz | 343/702 |
|---|---|---|---|
| 4,019,174 | 4/1977 | Vanderpool | 364/900 |
| 4,055,753 | 10/1977 | Rogers et al. | 364/466 |
| 4,531,232 | 7/1985 | Sakurai | 343/702 |
| 4,806,906 | 2/1989 | Oda et al. | 340/311.1 |
| 4,857,883 | 8/1989 | Mama | 340/311.1 |
| 4,879,756 | 11/1989 | Stevens et al. | 455/39 |
| 4,967,194 | 10/1990 | Haruki | 340/311.1 |

FOREIGN PATENT DOCUMENTS

| 0176242 | 8/1985 | European Pat. Off. . |
| 0295658 | 6/1988 | European Pat. Off. . |
| 2604315 | 9/1987 | France . |
| WO 86/02477 | 10/1985 | World Int. Prop. O. . |

*Primary Examiner*—Donald J. Yusko
*Assistant Examiner*—Michael Horabik
*Attorney, Agent, or Firm*—Frishauf, Holtz, Goodman & Woodward

[57] ABSTRACT

An electronic input-display apparatus, includes a casing having a microprocessor therein, a display device located above the casing and spaced from the casing by a predetermined distance, a data-input keyboard provided for the casing, a weighting section provided on the casing, and a radio transmitting/receiving device fitted in a pocket formed in the display device with an antenna extending upward from the display device. The microprocessor, the display device, the keyboard, the measuring section, and the radio transmitting/receiving device are electrically connected together.

6 Claims, 3 Drawing Sheets

ELECTRONIC INPUT-DISPLAY APPARATUS

This application is a continuation of application Ser. No. 07/467,846, filed Jan. 22, 1990, now abandoned.

BACKGROUND OF THE INVENTION

1. Field of the Invention

The present invention relates to an electronic input-display apparatus, such as an electronic weighing apparatus, an electronic cash register, an electronic cash register-weight measuring apparatus, or the like, which has both input and display sections and is provided with a radio or wireless transmitting/receiving device for transmitting and/or receiving data with reference to a host controller.

2. Description of the Related Art

For example, the electronic cash register-weight measuring apparatus is designed to measure the weight of an article of trade at the weight measuring section thereof. When the code identifying the trade article and the price per unit weight of that trade article are entered from a keyboard, the apparatus calculates the price of the trade article, on the basis of the weight measured by the weight measuring section and the price per unit weight. The measured weight, the price per unit weight, and the price of the trade article are displayed on the display section of the apparatus and are printed on a receipt. Simultaneously, data on the price per unit weight and that on the price of the trade article are stored in a memory, on the basis of the code of the trade article.

It is well known to connect electronic cash register-weight measuring apparatuses of the above-mentioned type to a host controller. Under the control of this host controller, data predetermined beforehand is written in a memory, and the pieces of data which are stored in the memory by each apparatus are collected or processed.

Depending upon the locations of the apparatuses, however, it is not always easy to connect the apparatuses to a host controller. If the layout of a store equipped with the apparatuses is often altered, the connection of the apparatuses to the host computer has to be changed each time the layout of the store is altered. This connection operation is troublesome to perform.

SUMMARY OF THE INVENTION

It is thought to provide a radio transmitting/receiving device for each apparatus, so as to perform wireless data communication between each apparatus and the host controller.

In general, the electronic cash register-weight measuring apparatus has a weighing section located on the upper face of the casing. An operation panel having a keyboard, a receipt-issuing port, etc. is located on the front face of the casing. A metallic arm stands upright on the casing, and a display section for showing a measured weight, a price per unit weight, a price of a trade article, etc. is attached to the tip end of the metallic arm. A radio transmitting/receiving device may be attached to the side wall of the casing, but in view of the efficiency at which the article-measuring operation is performed, it is desirable that the radio transmitting/receiving device be attached to the rear wall of the casing.

However, if the radio transmitting/receiving device is attached to the rear wall of the casing, extra space is needed for installation. In addition, the radio waves may be blocked or attenuated, due to the presence of the arm and the tray of the measuring section.

Accordingly, an object of the present invention is to provide an electronic input-display apparatus which is of a type enabling radio or wireless data communication, prevents attenuation of radio waves to the maximum possible degree, and does not adversely affect the efficiency of the article-measuring operation.

DETAILED DESCRIPTION OF THE PREFERRED EMBODIMENT

An electronic input-display apparatus according to an embodiment of the present invention will now be described, with reference to the accompanying drawings. The embodiment will be explained, referring to the case where the invention is applied to an electronic cash register-weight measuring apparatus.

Figure 1:
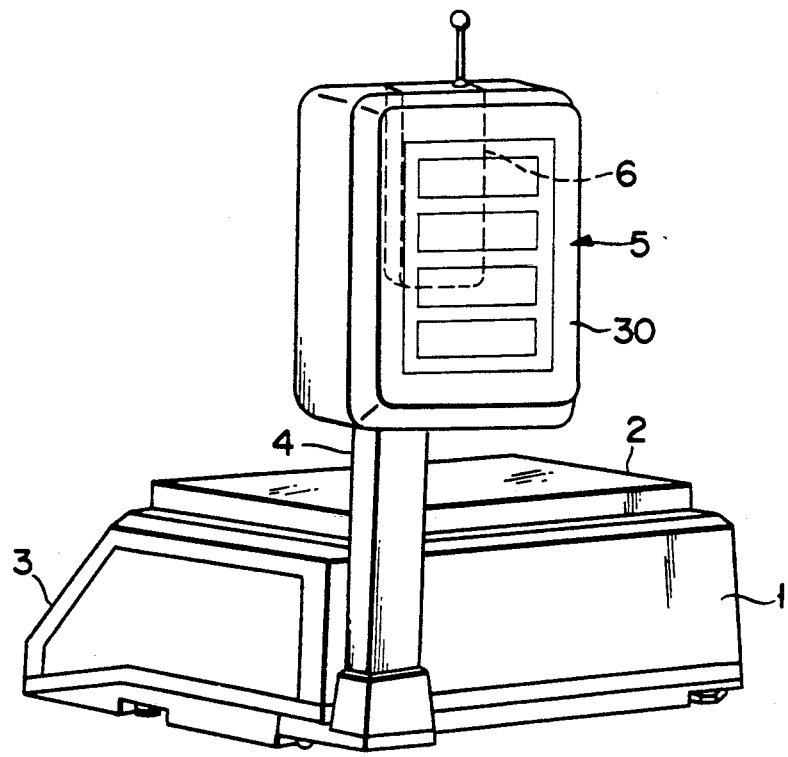
FIG. 1 is a perspective view showing the entire electronic cash register-weight measuring apparatus according to one embodiment of the present invention.

FIG. 1 shows the outward appearance of the electronic cash register-weight measuring apparatus. Referring to FIG. 1, a metallic weighing section 2 is located on the upper face of a casing 1, and an operation panel 3 having a keyboard 18, a receipt-issuing port, etc. is provided on the front face of the casing 1. The weighing section 2 is of a well-known structure, and outputs a weight measurement signal representing the weight of an article placed thereon. The keyboard 18 is also of a well-known structure, and permits the data required of both a controller and a display device (both will be described later) to be entered manually. The keyboard 18 constitutes an input section. A support member is projected from the rear wall of the casing 1. It supports the lower end of a metallic arm 4. The arm 4 extends upward in the vertical direction in parallel to the rear face of the casing 1. The upper end of the arm 4 is at a higher level than that of the weighing section 2. A display device 5 is attached to the upper end of the arm 4.

Figure 2:
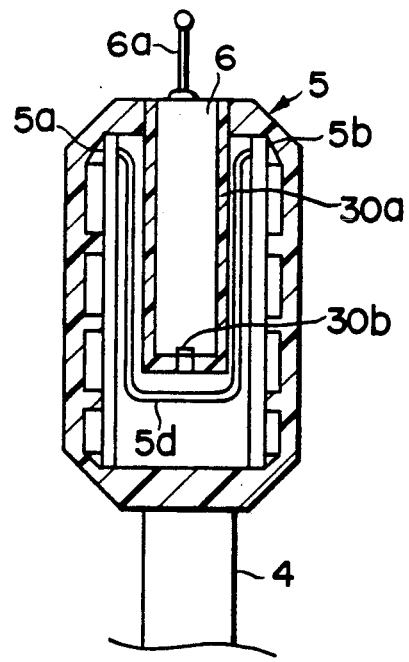
FIG. 2 is a view showing the internal structure of the display section employed in the apparatus shown in FIG. 1.

The display device 5 comprises a flat rectangular housing 30 formed of synthetic resin. As is shown in FIG. 2, a pocket 30a is defined in the interior of the housing 30. The pocket 30a opens in the upper face of the housing 30, and its dimensions are determined such that a radio or wireless transmitting/receiving device 6 inserted therein is held immovable. A contact 30b is located in the bottom of pocket 30a, and is electrically connected to the contact provided on the bottom face of the radio transmitting/receiving device 6 when the radio transmitting/receiving device 6 is inserted in the pocket 30a. Dot display tubes for electrically indicating the code (or name), the weight, the price per unit weight, the total price of an article of trade, respectively, are provided on both the front and rear faces of the housing 30 such that the dot display tubes on the front face correspond in location to their respective dot display tubes on the rear face. A control circuit board 5a on which circuits for controlling the dot display tubes on the front face are arranged is located between the front face and the pocket 30a. Likewise, a control circuit board 5b on which circuits for controlling the dot display tubes on the rear face are arranged is located between the rear face and the pocket 30a. A signal line 5d extending from both control circuit boards 5a and 5b is connected to the contact 30b mentioned above, whereby the control circuit boards 5a and 5b are electrically connected to the radio transmitting/receiving device 6.

Reference numeral 6a in FIG. 2 denotes an antenna of the radio transmitting/receiving device 6. The antenna 6a projects from the upper face of the display device 5 when the radio transmitting/receiving device 6 is fitted in the display device 5.

Figure 3:
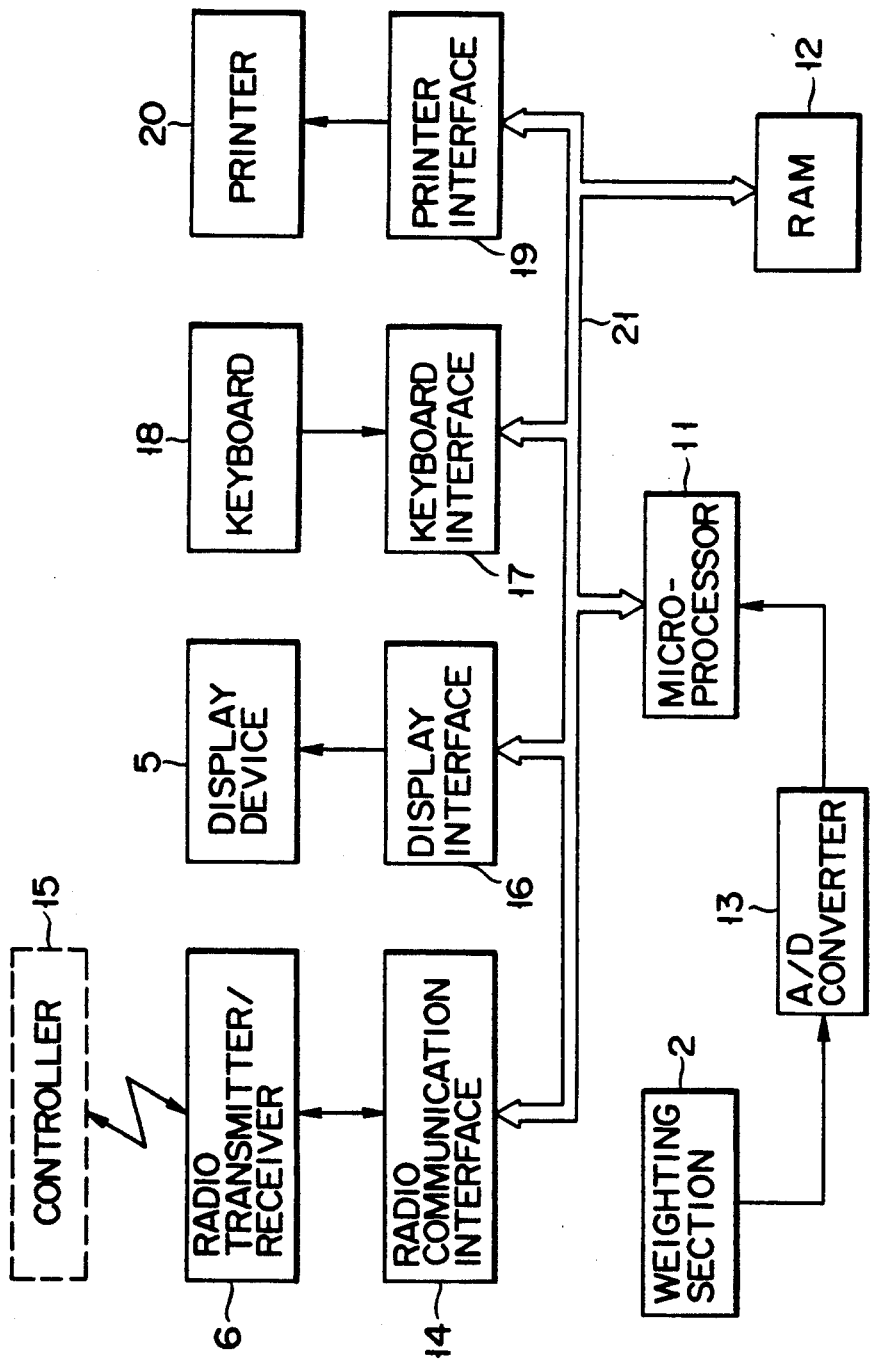
FIG. 3 is a block circuit diagram of the electric circuits of the apparatus shown in FIG. 1.

FIG. 3 is a block circuit diagram of the electric circuits of the electronic cash register-weight measuring apparatus. In FIG. 3, reference numeral 11 denotes a microprocessor which constitutes the main portion of a control section; reference numeral 12 denotes a RAM in which various memory portions used for data management are defined; reference numeral 13 denotes an A/D (analog-to-digital) converter for converting a weight measurement signal supplied from the weighing section 2 into a digital count value; reference numeral 14 denotes a radio communication interface for controlling the radio data communication which is performed between the apparatus and a host controller 15 through the radio transmitting/receiving device 6; reference numeral 16 denotes a display interface for controlling the display device 5 and supplying this display device 5 with data to be displayed; reference numeral 17 denotes a keyboard interface for controlling the keyboard 18 and receiving the signals entered from the keyboard 18; and reference numeral 19 denotes a printer interface for controlling a printer 20 which prints data on a receipt or the like and supplying the printer 20 with data to be printed.

The RAM 12 and the interfaces 14, 16, 17 and 19 are electrically connected to the microprocessor 11 through a bus line 21. The count values output from the A/D converter 13 are supplied, by interruption, to the microprocessor 11 at predetermined time intervals.

The microprocessor 11 is programmed such that, when preset data is output from the controller 15 through the radio transmitting/receiving device 6, it receives the data through the radio communication interface 14 and writes the received data in the predetermined memory portion of the RAM 12. It is also programmed such that, when a data collection command is output from the controller 15 through the radio transmitting/receiving device 6, it reads data out of a memory portion of the RAM 12 and outputs the read-out data through the radio communication interface 14.

The advantages of the embodiment having the above-mentioned construction will now be explained, referring to experiments which were conducted to measure the intensity of electric fields.

(Experiment 1)

Figure 4A:
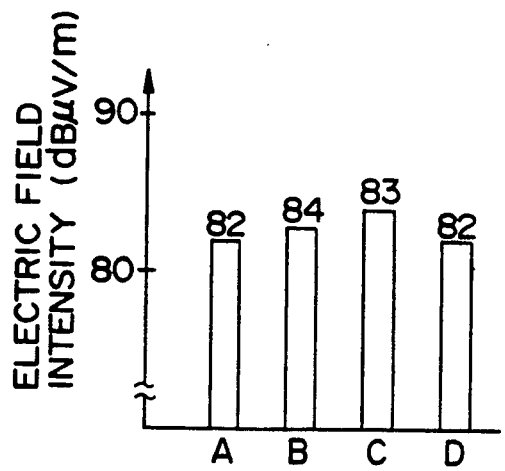
FIGS. 4A and 4B and FIGS. 5A and 5B are graphs showing results of the experiments which were conducted to compare the performance of the embodiment apparatus with that of a comparative apparatus.

An electronic cash register-weight measuring apparatus was prepared, wherein the radio transmitting/receiving device 6 was attached to the rear face of the housing 1 which is positioned to the opposite side of the panel 3, not to the display device 5. At a point 20m away from the apparatus, the signal (i.e., data) transmitted from the radio transmitting/receiving device 6 was received. The intensities of electric fields were measured on the basis of the direction in which the signal was received. FIG. 4A shows the intensities obtained by this measurement. In FIG. 4A, signal-receiving direction A represents the direction extending from the front face of the apparatus, signal-receiving direction B represents the direction extending from the left side face of the apparatus, signal-receiving direction C represents the direction extending from the rear face of the apparatus, and signal-receiving direction D represents the direction extending from the right side face of the apparatus.

(Experiment 2)

Figure 4B:
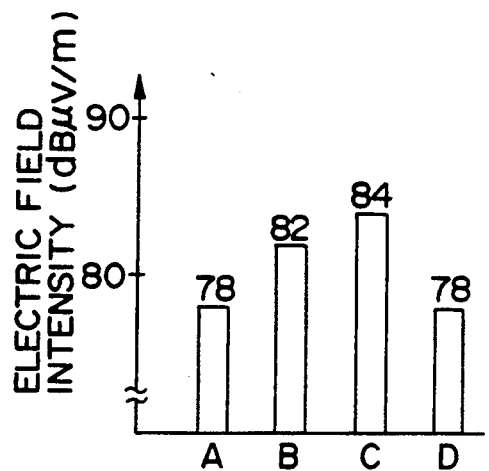

The electronic cash register-weight measuring apparatus prepared for this experiment was similar to that employed in Experiment 1. At a point 20m away from the apparatus, the signal (i.e., data) transmitted from the radio transmitting/receiving device 6 was received and the intensities of electric fields were measured on the basis of the direction in which the signal was received. FIG. 4B shows the intensities obtained by this measurement.

(Experiment 3)

Figure 5A:
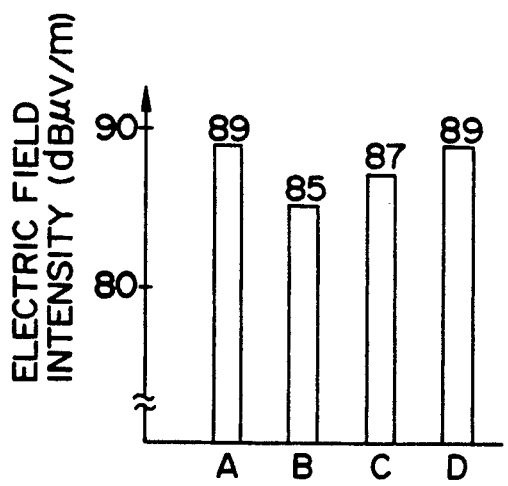

The electronic cash register-weight measuring apparatus shown in FIG. 1, which is provided with a radio transmitting/receiving device 6 therein was used in this experiment. At a point 20m away from the apparatus, the signal (i.e., data) transmitted from the radio transmitting/receiving device 6 was received and the intensities of electric fields were measured on the basis of the direction in which the signal was received. FIG. 5A shows the intensities obtained by this measurement.

(Experiment 4)

Figure 5B:
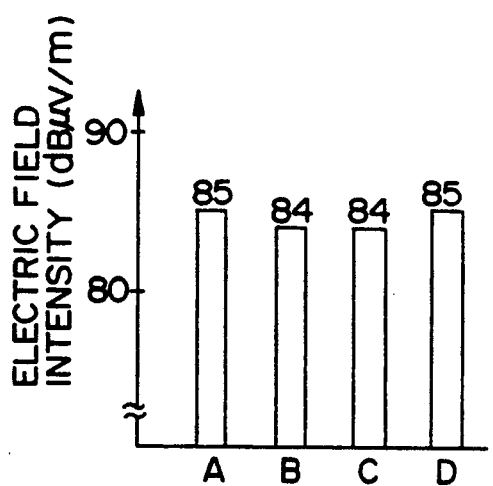

The electronic cash register-weight measuring apparatus prepared for this experiment was similar to that employed in Experiment 3. At a point 20m away from the apparatus, the signal (i.e., data) transmitted from the radio transmitting/receiving device 6 was received and the intensities of electric fields were measured on the basis of the direction in which the signal was received. FIG. 5B shows the intensities obtained by this measurement.

As is evident from the results of these experiments, it may be assumed that the radio waves transmitted from the radio transmitting/receiving device 6 were greatly attenuated by the metal tray of the measuring section 2 and by the metal arm 4 which supports the display device 5. In the embodiment, as well as by the reason that the antenna is positioned on the lower side of the housing of the invention, the radio transmitting/receiving device 6 is fitted in the display device 5 which is attached to the tip end of the arm 4 vertically extending from the casing 1, and through this radio transmitting/receiving device 6 the radio data communication is carried out between the apparatus and the host controller 15. With this construction, the radio waves were not attenuated as greatly as in the case where the radio transmitting/receiving device 6 was attached to the rear face of the casing 1. Therefore, the embodiment of the invention is extremely useful in practice.

With respect to the embodiment of the invention, it should be noted that no special space is required for the installation of the radio transmitting/receiving device 6, since the display device 5 in which the radio transmitting/receiving device 6 is fitted is smaller than the casing 1 and is located higher than the casing 1. In addition, the radio transmitting/receiving device 6 does not become hindrance to the article-weighing operation. Thus, the efficiency of the article-measuring operation is not adversely affected.

With respect to the embodiments of the present invention, moreover, it should be noted that the radio transmitting/receiving device 6 is located higher than, and sufficiently away from the tray of the measuring section 2. With this construction, the radio waves transmitted from the radio transmitting/receiving device 6 do not adversely affect the performance of the A/D converter 13.

In the above-mentioned embodiment, the radio transmitting/receiving device 6 is fitted in the interior of the display device 5, with the exception of the antenna 6a. However, the radio transmitting/receiving device 6 may be fitted in the display device 5 only in part, with the remaining portions projected from the display device 5. In addition, the radio transmitting/receiving device 6 need not be fitted or inserted in the interior of the display device 5; it may be attached to the outer side wall of the display device 5, for example.

The above embodiment was described, referring to an electronic cash register-weight measuring apparatus which is designed to calculate the price of an article on the basis of both the weight of the article and the price per unit weight of the article. However, the present invention is not limited to this embodiment. For example, it is applicable to an electronic weighing apparatus which is designed only to measure the weight of an article and which does not calculate the price of the article. It is also applicable to an electronic cash register, or other types of electronic input-display apparatuses.

As was detailed above, the present invention provides an electronic input-display apparatus which is capable of radio or wireless data communication through a radio or wireless transmitting/receiving device, and which is featured in that no extra space is required for the installation of the radio transmitting/receiving device, in that attenuation of the radio waves transmitted from the radio transmitting/receiving device is prevented remarkably, and in that the radio transmitting/receiving device does not become any hindrance to the operations of the apparatus.

What is claimed is:

1. A electronic input-display apparatus for inputting data and displaying the data, comprising:
   a casing having control means;
   a display device located above the casing for displaying the input data, said display device including a housing, a display portion provided on the housing, and a pocket defined in the housing;
   an input section provided on the casing, for inputting the data;
   a radio transmitting/receiving device housed in the pocket of the display device and located away from the casing; and
   connection means for electrically connecting the control means, the display portion, the input section, and the radio transmitting/receiving device together to enable the data inputted by the input section and data received through the radio transmitting/receiving device to be displayed on the display portion, and to be transmitted to a remote means for processing said data.

2. An electronic input-display apparatus according to claim 1, wherein said radio transmitting/receiving device includes an antenna extending upward from said display device.

3. An electronic input-display apparatus according to claim 1, further comprising a metallic arm having a lower portion supported by said casing and an upper portion supporting said display device.

4. An electronic input-display apparatus for inputting data and displaying the data, comprising:
   a casing having control means;
   a display device located above the casing, for displaying input data, said display device including a housing, a display portion provided on the housing, and a pocket defined in the housing;
   a data-input keyboard provided on the casing, for inputting the data;
   a measuring section provided for the casing;
   a radio transmitting/receiving device housed in the pocket of the display device and located away from the casing; and
   connection means for electrically connecting the control means, the display portion, the input section, and the radio transmitting/receiving device together to enable the data inputted by the input section and data received through the radio transmitting/receiving device to be displayed on the display portion, and to be transmitted to a remote means for processing said data.

5. An electronic input-display apparatus according to claim 4, wherein:
   said data-input keyboard is provided on one side of the casing and said display portion is provided on one side of the housing, opposite to said one side of the casing;
   another display portion provided on another side of the housing opposite to said one side of the housing on which said display portion is provided;
   said pocket being formed on an upper side of the housing so that said radio transmitting/receiving device is positioned between said display portions; and
   said radio transmitting/receiving device being removably inserted in said pocket.

6. An electronic input-display apparatus for inputting and displaying the data, comprising:
   a casing having control means;
   an input section provided on one side of said casing, for inputting the data;
   a display device located above the casing for displaying the input data, said display device including a housing, a first display portion provided on one side of said housing opposite to said one side of said casing, a second display portion provided on another side of the housing opposite to that on which said first display portion is provided, and a pocket defined in an upper side of said housing between said first and second display portions and located away from said casing;
   a radio transmitting/receiving device removably inserted in said pocket of said display device; and
   connection means for electrically connecting the control means, the first and second display portions, the input section, and the radio transmitting/receiving device together to enable the data inputted by the input section and data received through the radio transmitting/receiving device to be displayed on said first and second display portions, and to be transmitted to a remote means for processing said data.

* * * * *